United States Patent
Frisch

(10) Patent No.: US 6,517,100 B2
(45) Date of Patent: Feb. 11, 2003

(54) GAS BAG RESTRAINT DEVICE

(75) Inventor: Ralph Frisch, Mömbris (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/861,252

(22) Filed: May 18, 2001

(65) Prior Publication Data

US 2001/0042978 A1 Nov. 22, 2001

(30) Foreign Application Priority Data

| May 19, 2000 | (DE) | 200 08 916 U |
| Jun. 16, 2000 | (DE) | 200 10 726 U |
| Jul. 13, 2000 | (DE) | 200 12 077 U |
| Dec. 28, 2000 | (DE) | 100 65 463 |

(51) Int. Cl.[7] .............................................. B60R 21/20
(52) U.S. Cl. ........................ 280/728.2; 280/728.3; 280/740
(58) Field of Search ......................... 280/728.2, 728.3, 280/731, 740

(56) References Cited

U.S. PATENT DOCUMENTS 5,125,682 A * 6/1992 Hensler et al. ............. 280/731
6,042,147 A * 3/2000 Nishijima et al. .......... 280/731

FOREIGN PATENT DOCUMENTS

| DE | 197 49 914 | * 5/1999 |
| WO | WO 97/34783 | 9/1997 |

* cited by examiner

Primary Examiner—Peter C. English

(57) ABSTRACT

The invention relates to a gas bag restraint device comprising a gas bag module having an outlet opening. The module has a gas generator and a gas bag, the latter including a front wall with a center section. This front wall, onto which an occupant who is to be restrained can strike in a case of restraint, has a depression. The depression is defined by the center section of the front wall being permanently fastened to the module and, on inflation of the gas bag, is prevented from a free movement. The restraint device further comprises a module covering closing said outlet opening. A holding part is provided surrounding the gas generator and fastened to the module, to which holding part the center section is fastened.

9 Claims, 1 Drawing Sheet

GAS BAG RESTRAINT DEVICE

TECHNICAL FIELD

The invention relates to a gas bag restraint device comprising a gas bag module.

BACKGROUND OF THE INVENTION

A known gas bag restraint device in which a center section of a front wall of the gas bag is fastened to the module is described in DE 197 49 914 A1. The gas bag used there has, in the inflated state, an annular chamber which is to be filled with gas. The center section is either fastened directly to the gas generator or, if gas is blown in via the steering column, is permanently fastened to the module via a sleeve, i.e. it maintains fastened to the module even in the inflated state of the gas bag and is, therefore, prevented from a free movement while unfolding.

BRIEF SUMMARY OF THE INVENTION

The invention provides a gas bag restraint device, in which the gas generator housing is subjected to lower mechanical stresses than in the prior art and in which the gas bag is subjected to lower thermal stresses than in the prior art. This is achieved in a gas bag restraint device which comprises a gas bag module with an outlet opening. The module has a gas generator and a gas bag, the latter including a front wall with a center section. This front wall onto which an occupant who is to be restrained can strike in a case of restraint has a depression defined by the center section of the front wall being permanently fastened to the module and, on inflation of the gas bag, is prevented from a free movement. The restraint device further comprises a module covering closing an outlet opening. A holding part is provided surrounding the gas generator and fastened to the module, on which holding part the center section is fastened. Preferably the holding part is a cup-shaped diffusor having a base and which, with an underside of the base pointing to the module covering, is turned over the gas generator to be attached to the module, the center section being fastened to the base of the diffusor. In the device proposed, a spacing is achieved between the gas generator and the gas bag fabric by the holding part, so that the gas bag fabric does not have the gas flowing directly against it and is thus subjected to lower stresses. Furthermore, the force necessary for holding back the center section is also not introduced into the gas generator housing, which in any case is subjected to high stresses on inflation of the gas bag. Rather, the force summoned up by the holding back of the center section is introduced into the holding part. By the diffusor being constructed in a cup shape and being turned over the gas generator, nevertheless a compact construction is produced.

The center section can be prevented not only from a free but, preferably, from any movement.

Preferably, the diffusor is not only spaced apart from the gas generator radially but also axially, namely in the region of the base, so that between the housing of the gas generator and the diffusor an equalizing chamber for gas can be formed.

The fastening of the center section can take place for example through a fastening of a metal emblem, visible from outside the covering, on the holding part. The fastening of the heavy metal emblem therefore has a dual function, by on the one hand serving to hold back the emblem and on the other hand also to hold back the center section. The metal emblem can also prevent a section of the module covering, lying immediately beneath the emblem, from swiveling on opening of the module covering, so that in this embodiment the center section is gripped between the holding part and the underside of the module covering.

According to another development, the module covering has a section which adjoins the center section. This section is permanently fastened to the holding part and the fastening of this section also serves for fastening the center section.

Preferably, the holding part and the gas generator project into the interior of the gas bag, so that between the module housing and the diffusor an annular space is produced to accommodate the annular, folded gas bag package.

DETAILED DESCRIPTION OF THE PREFERRED EMBODIMENTS

Figure 1:
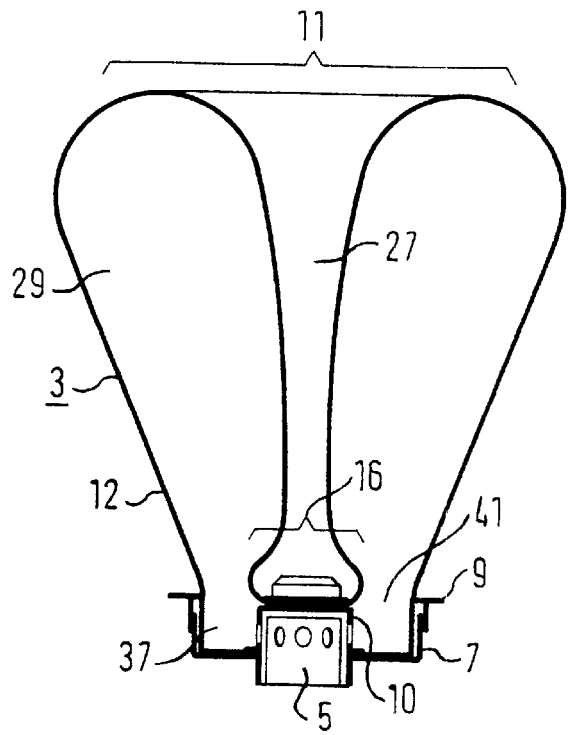
FIG. 1 shows a cross-sectional view through a gas bag restraint device according to the invention, with inflated gas bag.

In FIG. 1 a gas bag restraint device is shown with a gas bag module which has a gas bag 3 accommodated in the steering wheel or in the instrument panel, a gas generator 5 and a module housing 7 with a module covering 9. The gas generator 5 is surrounded by a holding part in the form of a cup- or bell-shaped diffusor 10, which is turned over the gas generator 5 from above, pointing with the underside of the base to the module covering 9, and is fastened to the module, more precisely to the module housing 7. Instead of the diffusor 10, for example also a bracket surrounding the gas generator 5 and fastened rigidly to the module housing 7, or another holding part having an identical function, can be provided.

The gas bag has several sections, namely a front wall 11 which faces the occupant in the inflated state and onto which the latter strikes in the case of restraint. Furthermore, a rear wall 12 is provided. The front wall has a deep depression 27 which is formed in that a middle section of the front wall 11, hereinafter named the center section 16, is prevented from any movement out from the module in the case of restraint. Thereby, an annular chamber 29 is produced, which is to be inflated. The module covering 9 has a section which adjoins the center section 16 and is permanently fastened to the diffusor 10 (see FIG. 2). For fastening this section of the module covering 9, a metal reinforcement plate 31 is integrated in its interior, from which thread bolts 33 project, which protrude through the center section 16 and the base 35 of the diffusor 10, in order to be screwed from below with nuts.

The gas bag 3 is housed in the folded state in an annular chamber 37 between the diffusor 10 and the outer wall of the module housing 7.

On inflation of the gas bag, gas firstly flows out from the gas generator 5 into an equalizing chamber between the gas generator housing (shown) and the diffusor 10, because the diffusor 10 is spaced from the gas generator housing both radially and also between the base and upper end wall of the generator housing. From the equalizing chamber, the gas arrives into the folded region of the gas bag 3 and inflates it.

The gas bag 3 tears the covering 9 open in the region of an annular weakened line 39, so that an annular outlet opening 41 is produced, via which the gas bag unfolds toward the occupant.

Figure 2:
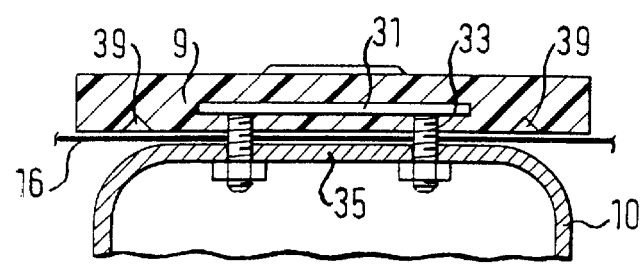
FIG. 2 shows a sectional view through the module covering in the region of the center section in FIG. 1

In the embodiment according to FIGS. 1 and 2, the center section 16 is gripped between the underside of the module covering 9 and the base 35 and is thereby fastened permanently to the diffusor.

Figure 3:
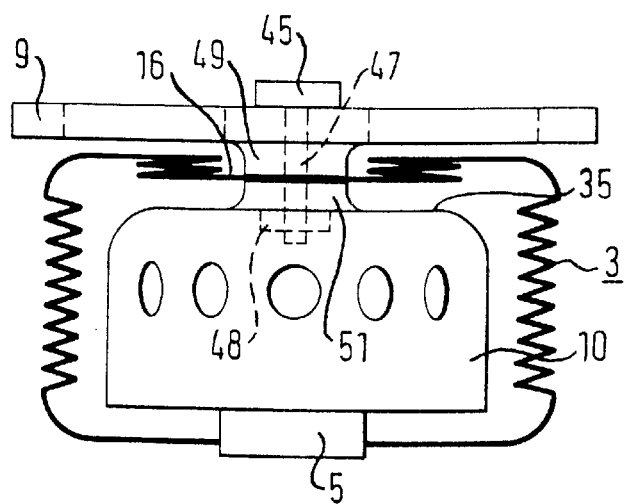
FIG. 3 shows a sectional view through a second embodiment of the gas bag restraint device according to the invention.

In the embodiment according to FIG. 3, an emblem 45 of sheet metal, visible from the exterior and placed onto the covering 9, is provided with a threaded pin 47 which projects through the covering 9 and the base 35 of the diffusor 10 in order to be screwed from below. Via the fastening of the emblem 45, the gripping and fastening of the part of the module covering 9 adjoining the center section 16 and of the center section 16 also takes place. A corresponding nut is designated by 48. The underside of the module covering 9 and the top side of the base 35 have each extensions 49 and 51, respectively, which are facing each other.

Also in this embodiment, the diffusor 10 and the gas generator 5 project into the interior of the gas bag 3.

Instead of the reinforcement plate 31 together with thread bolts 33, extensions formed in one piece on the rear side, e.g. in pin form, can project from the module covering 9, which extend through the openings in the diffusor 10 and are, for example, thermally deformed at the free end in order to be permanently fastened to the diffusor 10.

Instead of the thread bolts 33, bolts or tongues can also protrude, which are deformed at the free end.

What is claimed is:

1. A gas bag restraint device for helping to restrain an occupant of a vehicle during a vehicle crash event, the restraint device comprising:
   a gas bag module with an outlet opening,
   an inflatable gas bag;
   a gas generator supplying gas for inflating the gas bag;
   a module cover closing the outlet opening;
   a holding part surrounding the gas generator, and
   an emblem arranged on an outer side of the module cover which is visible from outside the module cover,
   the gas bag having a front wall with a center section, the occupant contacting the front wall during restraint,
   the front wall having a depression defined by the center section of the front wall being permanently fastened to the holding part which prevents the center section from a free movement upon inflation of the gas bag,
   the emblem having a back side and a fastener on the back side which extends to and is attached to the holding part,
   the module cover having a cover section lying immediately beneath the emblem and being permanently attached to the holding part via the fastener, and
   the center section being gripped between the holding part and an underside of the cover section to be permanently fastened to the holding part.

2. The gas bag restraint device according to claim 1 wherein the holding part is a diffusor having the shape of a round container, the diffusor including a base, a side of the base being adjacent to the module cover and an opposite open end of the diffusor being through which the gas generator extends, the center section being fastened to the base of the diffusor.

3. The gas bag restraint device according to claim 2 wherein the diffusor is spaced apart from the gas generator radially and in a region of the base.

4. The gas bag restraint device according to claim 1 wherein the holding part together with the gas generator project into an interior of the gas bag.

5. A gas bag restraint device for helping to restrain an occupant of a vehicle during a vehicle crash event, the restraint device comprising:
   a gas bag module with an outlet opening,
   an inflatable gas bag;
   a gas generator supplying gas for inflating the gas bag;
   a module cover closing the outlet opening;
   a reinforcement plate embedded within the module cover, and
   a holding part surrounding the gas generator,
   the gas bag having a front wall with a center section,
   the occupant contacting the front wall during restraint,
   the front wall having a depression defined by the center section of the front wall being permanently fastened to the holding part which prevents the center section from a free movement upon inflation of the gas bag,
   the reinforcement plate having a fastener which extends to and is permanently attached to the holding part,
   the fastener on the reinforcement plate passing through a portion of the module cover so that the portion of the module cover is also permanently attached to the holding part.

6. The gas bag restraint device according to claim 5 wherein the center section of the gas bag is clamped between the holding part and an underside of the portion of the module cover to permanently attach the center section of the gas bag to the holding part.

7. The gas bag restraint device according to claim 6 wherein the holding part is a diffusor having the shape of a round container, the diffusor including a base, a side of the base being adjacent to the module cover and an opposite open end of the diffusor being through which the gas generator extends, the center section being fastened to the base of the diffusor.

8. The gas bag restraint device according to claim 7 wherein the holding part is a diffusor having the shape of a round container, the diffusor including a base, a side of the base being adjacent to the module cover and an oppositeis spaced apart from the gas generator radially and in a region of the base.

9. The gas bag restraint device according to claim 6 wherein the holding part together with the gas generator project into an interior of the gas bag.

* * * * *

UNITED STATES PATENT AND TRADEMARK OFFICE
CERTIFICATE OF CORRECTION

PATENT NO. : 6,517,100 B2
DATED : February 11, 2003
INVENTOR(S) : Ralph Frisch

It is certified that error appears in the above-identified patent and that said Letters Patent is hereby corrected as shown below:

Column 4,
Line 42, after "claim" change "6" to -- 5 --.
Lines 49-54, should be as follows:
-- 8. The gas bag restraint device according to claim 7 wherein the diffuser is spaced apart from the gas generator radially and in a region of the base. --.
Line 56, after "claim" change "6" to -- 5 --.

Signed and Sealed this

Twenty-third Day of November, 2004

JON W. DUDAS
*Director of the United States Patent and Trademark Office*